United States Patent
Blackwell et al.

(10) Patent No.: US 9,381,863 B2
(45) Date of Patent: Jul. 5, 2016

(54) DOG STEP ATTACHMENT FOR RECEIVER HITCH OF PICKUP TRUCK

(71) Applicants: James Blackwell, Salina, KS (US); Alan Suter, Oakley, KS (US)

(72) Inventors: James Blackwell, Salina, KS (US); Alan Suter, Oakley, KS (US)

(*) Notice: Subject to any disclaimer, the term of this patent is extended or adjusted under 35 U.S.C. 154(b) by 0 days.

(21) Appl. No.: 14/478,208

(22) Filed: Sep. 5, 2014

(65) Prior Publication Data

US 2015/0060205 A1     Mar. 5, 2015

Related U.S. Application Data

(60) Provisional application No. 61/874,319, filed on Sep. 5, 2013.

(51) Int. Cl.
*B60R 3/00* (2006.01)
*B60R 3/02* (2006.01)

(52) U.S. Cl.
CPC .. *B60R 3/007* (2013.01); *B60R 3/02* (2013.01)

(58) Field of Classification Search
CPC .................. B60R 3/007; B60R 3/02
See application file for complete search history.

(56) References Cited

U.S. PATENT DOCUMENTS

| | | | | |
|---|---|---|---|---|
| 2,218,060 A * | 10/1940 | Watson | ...................... | B60R 3/02 105/447 |
| 3,104,473 A * | 9/1963 | Rose | ................... | E05D 11/0009 24/563 |
| 5,236,065 A * | 8/1993 | Isogai | ....................... | B66F 7/04 187/219 |
| 5,553,467 A * | 9/1996 | Calabro | ................. | A44C 7/006 24/514 |
| 5,771,980 A * | 6/1998 | Mork | ..................... | A01B 31/00 172/445.1 |
| 7,114,736 B2 | 10/2006 | Stodola et al. | | |
| 7,766,357 B2 | 8/2010 | Arvanites | | |
| 7,775,536 B2 | 8/2010 | Shumway | | |
| 7,954,836 B2 | 6/2011 | Mann | | |
| 7,967,311 B2 | 6/2011 | Phillips | | |
| 8,857,626 B1 * | 10/2014 | Breinholt | ............. | B01D 33/056 210/400 |
| 2005/0275187 A1* | 12/2005 | Chaudoin | ............... | B60R 3/007 280/166 |
| 2009/0008894 A1* | 1/2009 | Kuntze | ...................... | B60R 3/02 280/166 |
| 2009/0014978 A1* | 1/2009 | Shumway | ................. | B60R 3/02 280/166 |
| 2010/0124477 A1* | 5/2010 | Wang | ........................ | B60R 3/02 414/462 |
| 2014/0093304 A1* | 4/2014 | Muraoka | ................... | B60R 3/02 403/116 |

* cited by examiner

*Primary Examiner* — Alvin Chin-Shue
(74) *Attorney, Agent, or Firm* — Jeffrey L. Thompson; Thompson & Thompson, P.A.

(57) ABSTRACT

A dog step attachment attaches to a receiver hitch of a pickup truck to provide an intermediate step for assisting a dog in jumping into the bed of the pickup truck. The attachment includes a first frame member received in the receiver hitch, a second frame member pivotally connected to a rearward end of the first frame member, a third frame member connected to the second frame member, and a platform attached to and supported by the third frame member. The second frame member is movable relative to the first frame member between a folded down position for use as a dog step and a folded up position for transport. Springs are used to hold the second frame member in over-center conditions in the folded down and folded up positions. Adjustments are provided for accommodating different heights of receiver hitches and pickup beds.

15 Claims, 5 Drawing Sheets

DOG STEP ATTACHMENT FOR RECEIVER HITCH OF PICKUP TRUCK

RELATED APPLICATIONS

This application claims priority of U.S. Provisional Application No. 61/874,319 filed on Sep. 5, 2013. The content of this prior application is incorporated herein by reference.

BACKGROUND OF THE INVENTION

1. Field of the Invention

The present invention relates generally to steps for pickup trucks and attachments for vehicle receiver hitches and, in particular, to an adjustable platform that can be attached to a receiver hitch of a pickup truck for providing an intermediate step for a dog jumping into the bed of the pickup truck.

2. Description of the Related Art

Various devices are known for attaching to receiver hitches of vehicles. For example, cargo baskets and platforms are commonly attached to receiver hitches to provide additional space to carry things on a vehicle. However, while such cargo baskets and platforms are suitable for their intended purpose, they are not suitable for use as a step to assist a dog in jumping into the bed of a pickup.

Step assemblies are also known for attaching to receiver hitches of vehicles. For example, U.S. Pat. Nos. 7,114,736, 7,766,357, 7,775,536, 7,954,836, and 7,967,311 disclose various types of step assemblies for receiver hitches. Some of these step assemblies include pivot structures for allowing the steps to be folded into a stowed position for transport. However, most of these step assemblies are not particularly suitable for use as a dog step, and are not adjustable in a manner that would allow them to be used as a dog step with various heights of receiver hitches and pickup beds.

There is a need in the industry for a dog step attachment for a receiver hitch of a pickup.

SUMMARY OF THE INVENTION

The present invention provides a dog step attachment that attaches to a receiver hitch of a pickup truck to provide an intermediate step for assisting a dog in jumping into the bed of the pickup truck. The attachment includes a first frame member received in the receiver hitch, a second frame member pivotally connected to a rearward end of the first frame member, a third frame member connected to the second frame member, and a platform attached to and supported by the third frame member. The second frame member is movable relative to the first frame member between a folded down position for use as a dog step and a folded up position for transport. Springs are used to hold the second frame member in over-center conditions in the folded down and folded up positions. Adjustments are provided for accommodating different heights of receiver hitches.

According to a first aspect of the present invention, a dog step attachment is provided for use with a pickup truck, comprising: a first frame member adapted to be received in a receiver hitch of the pickup truck and extend rearwardly from the receiver hitch; a second frame member having first and second ends, the first end being pivotally connected to a rearward end of the first frame member by a first pivot connection; a third frame member connected to the second end of the second frame member; and a platform attached to and supported by the third frame member for providing an intermediate step for assisting a dog in jumping into a bed of the pickup truck.

According to a second aspect of the present invention, a dog step attachment is provided in combination with a pickup truck having a bed, a tailgate, and a receiver hitch. The dog step attachment includes: a first frame member received in the receiver hitch of the pickup truck and extending rearwardly from the receiver hitch; a second frame member having first and second ends, the first end being pivotally connected to a rearward end of the first frame member by a first pivot connection; a third frame member connected to the second end of the second frame member; and a platform attached to and supported by the third frame member for providing an intermediate step for assisting a dog in jumping into the bed of the pickup truck. The second frame member is movable relative to the first frame member between a folded down position for use as a dog step and a folded up position for transport.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A dog step attachment 10 according to the present invention will now be described in detail with reference to FIGS. 1 to 6 of the accompanying drawings.

Figure 1:
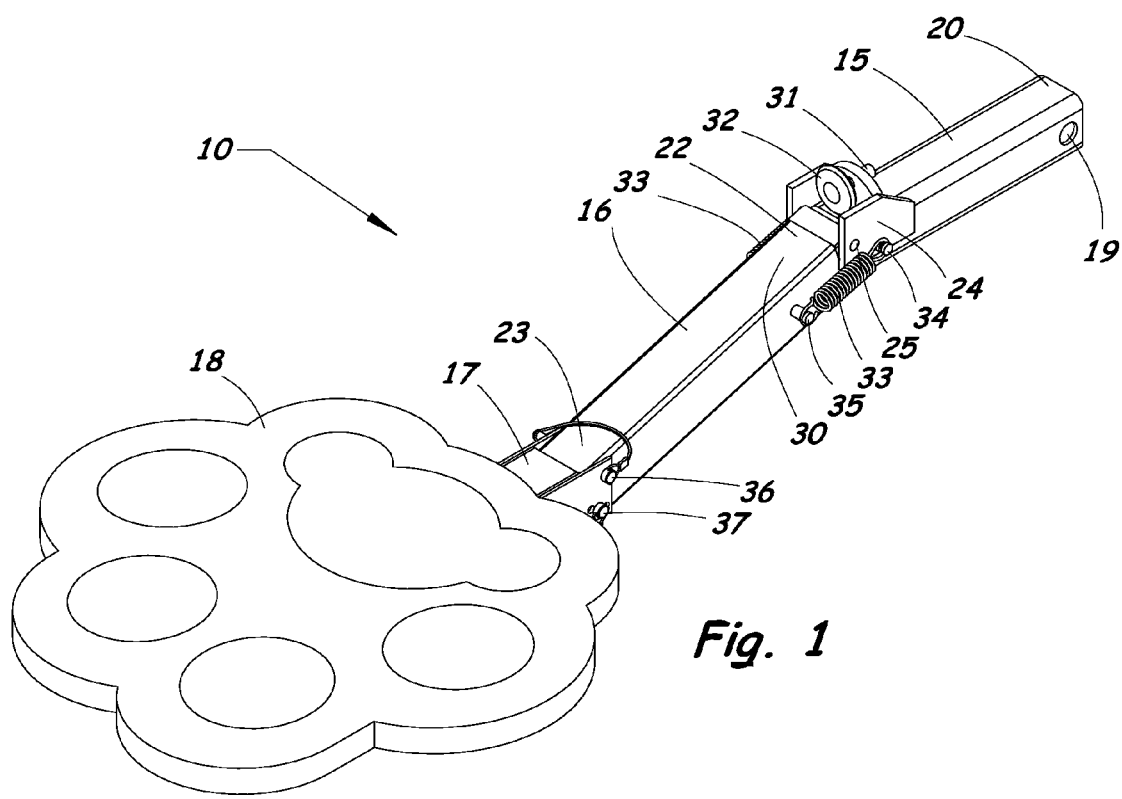
FIG. 1 is a perspective view of a dog step attachment for a receiver hitch according to the present invention.
Figure 2:
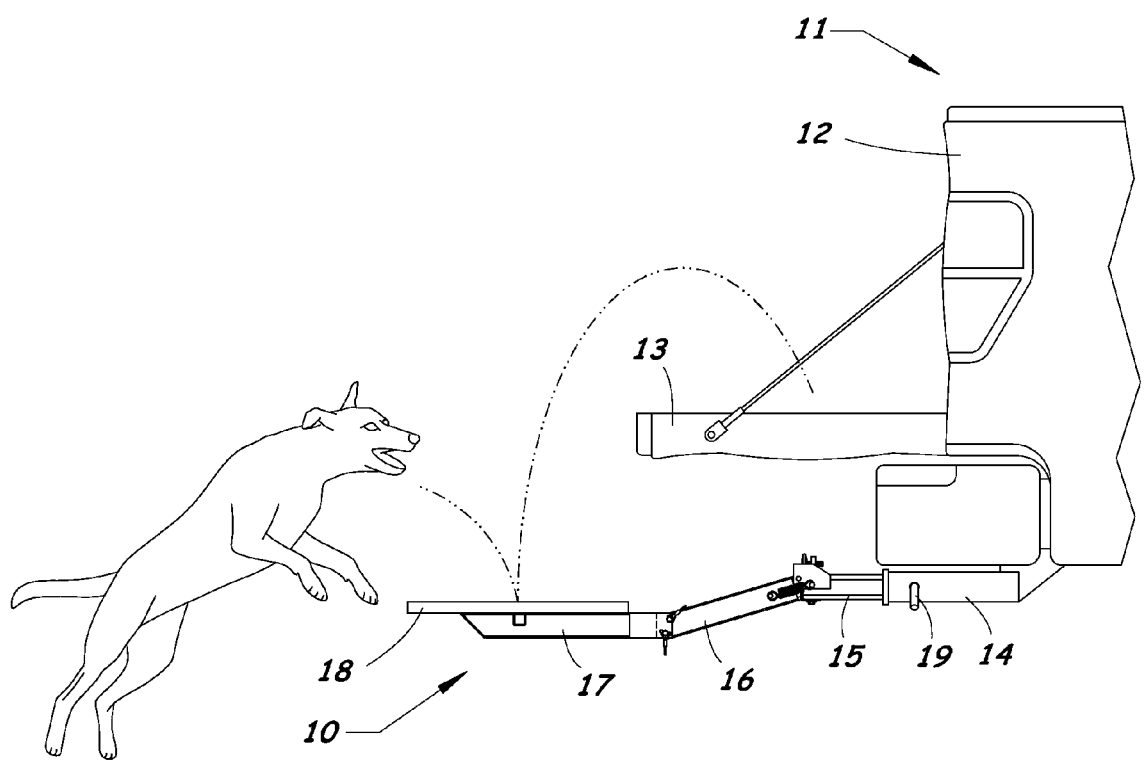
FIG. 2 is a side elevation view of the dog step attachment attached to a receiver hitch of a pickup truck and shown in a folded down position for use as a step.
Figure 3:
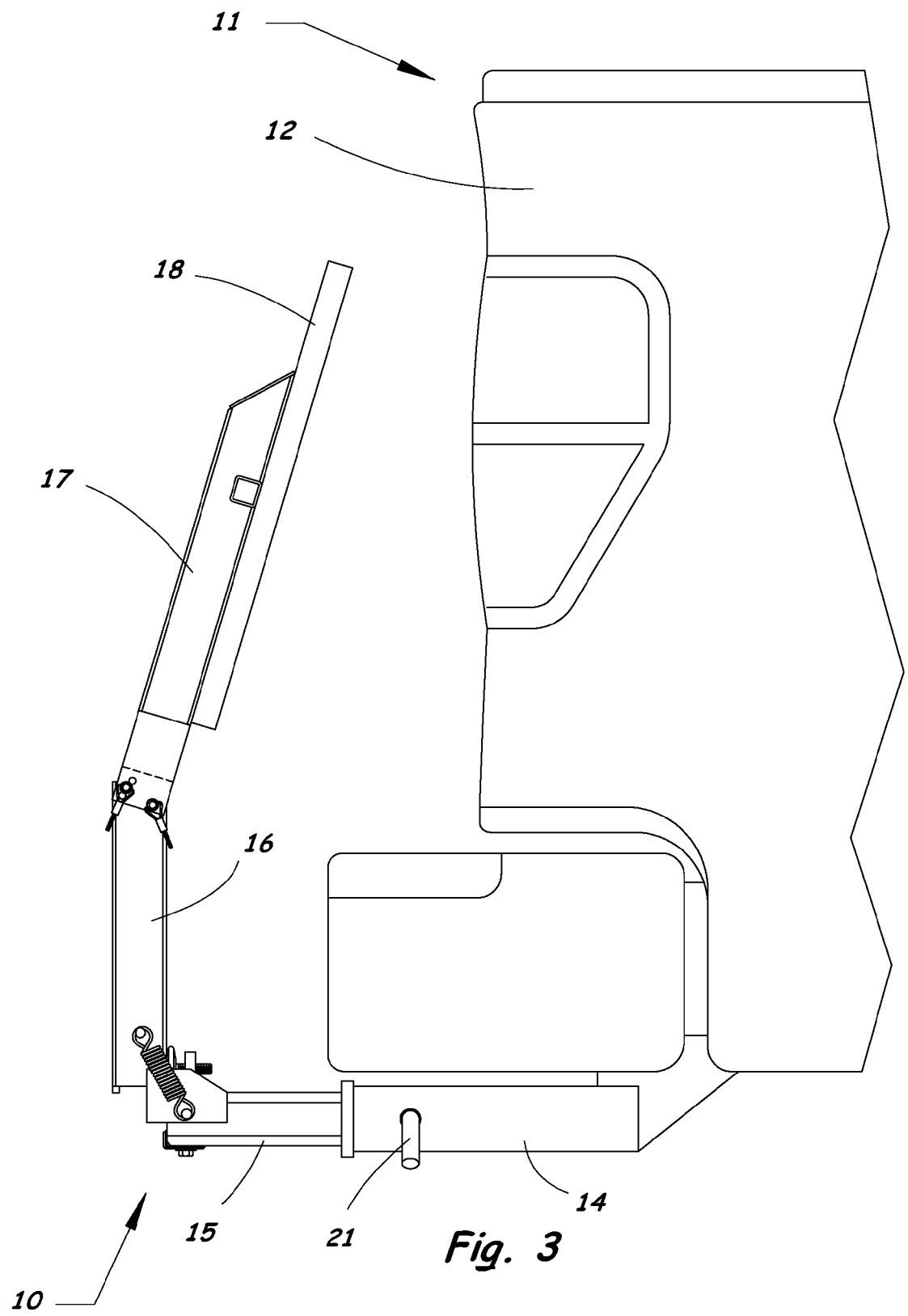
FIG. 3 is a side elevation view of the dog step attachment attached to a receiver hitch of a pickup truck and shown in a folded up position for transport.

The dog step attachment 10 is made for use with a pickup truck 11 having a truck bed 12, a tailgate 13, and a receiver hitch 14. The tailgate 13 is a conventional tailgate that can be opened into a horizontal position (as shown in FIG. 2) to allow access to the truck bed 12, or closed into a vertical position (as shown in FIG. 3) to allow items to be transported in the truck bed 12.

The dog step attachment 10 includes a first frame member 15, a second frame member 16, a third frame member 17, and a platform 18. The first frame member 15 is a length of square tubing with a suitable outer dimension that allows it to be received in the receiver hitch 14 of the pickup truck 11. A pin opening 19 is provided near a front end 20 of the first frame member 15 for receiving a hitch pin 21 to secure the first frame member 15 within the receiver hitch 14. The first frame member 15 extends rearwardly from the receiver hitch 14.

The second frame member 16 has first and second ends 22, 23. The first end 22 is pivotally connected to a rearward end 24 of the first frame member 15 by a first pivot connection 25. A first abutment 26 is located on a bottom side of the first end 22 of the second frame member 16 for limiting an extent of movement of the second frame member 16 in a first direction about the first pivot connection 25.

Figure 4:
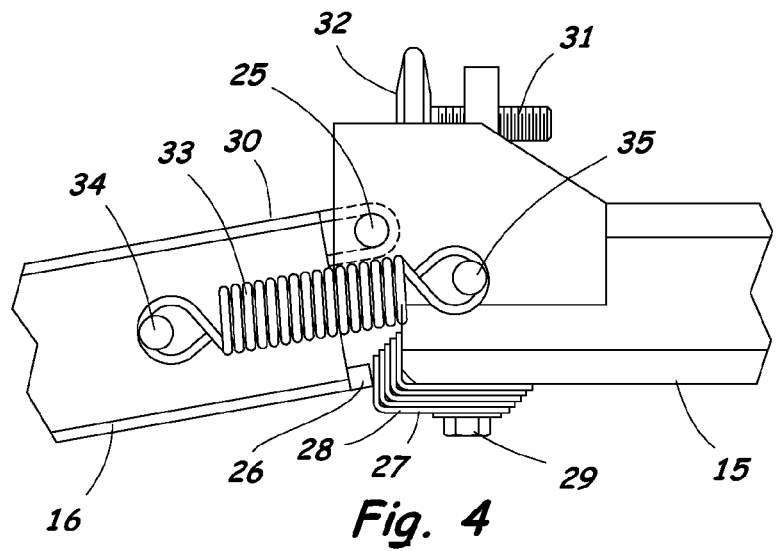
FIG. 4 is a detail view of the adjustable pivot connection of the dog step attachment with a plurality of shims used to set the angle of the dog step to accommodate a pickup truck bed having a relatively low height.
Figure 5:
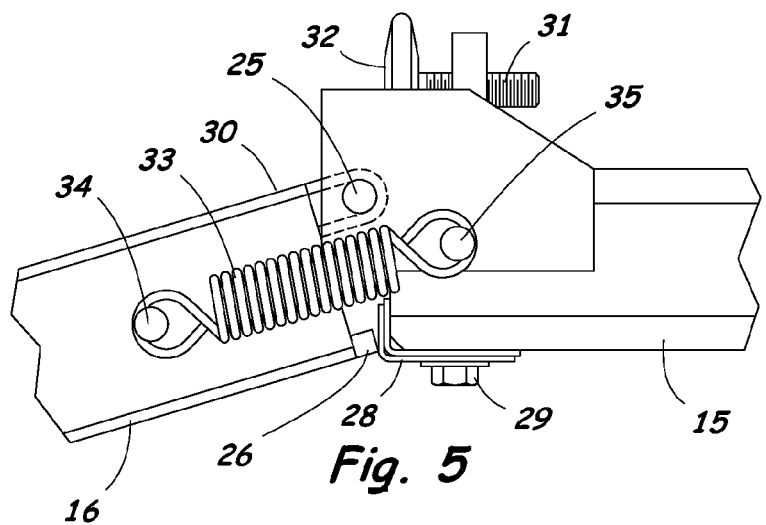
FIG. 5 is another detail view of the adjustable pivot connection with a reduced number of shims used to set the angle of the dog step to accommodate a pickup truck bed having a medium height.
Figure 6:
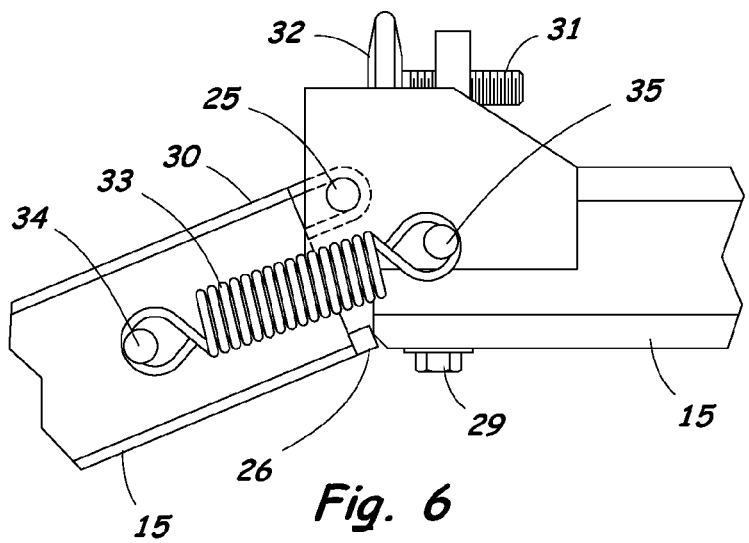
FIG. 6 is another detail view of the adjustable pivot connection with all of the shims removed to set the angle of the dog step to accommodate a pickup having a relatively high height.
Figure 7:
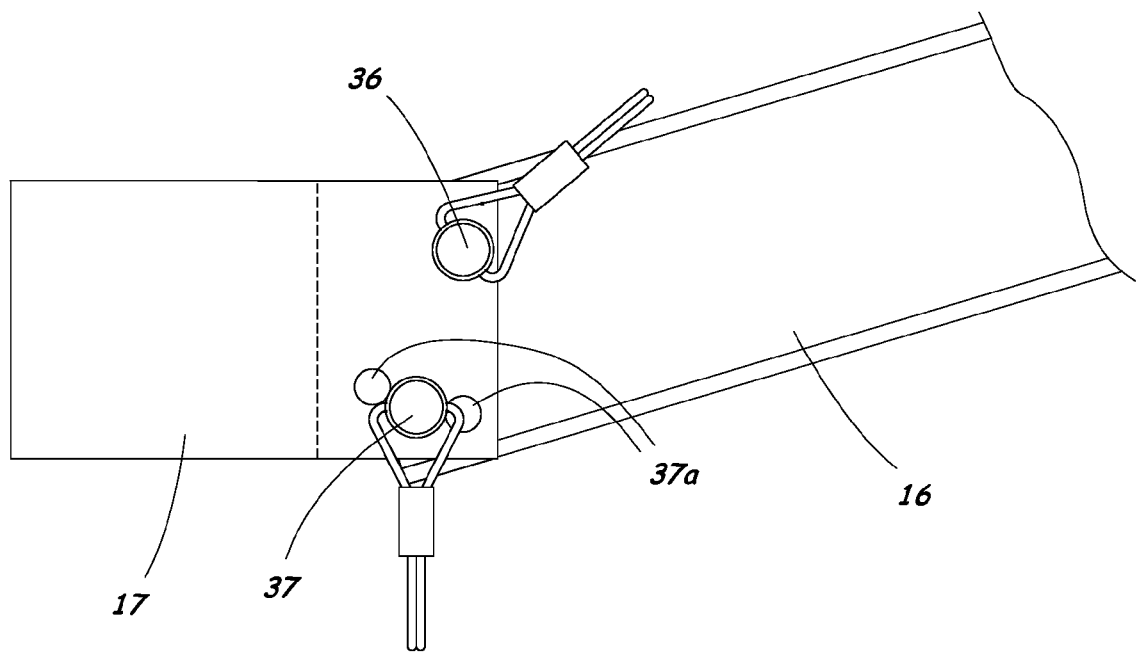
FIG. 7 is a detail elevation view showing the adjustable pivot connection between the second frame member and the third frame member.

A first adjustment means 27 is provided for setting an angle at which the second frame member 16 extends relative to the first frame member 15 in a folded down position. The first adjustment means 27 includes a plurality of shims 28 that can be selectively attached to the first frame member 15 to provide a surface for engaging the first abutment 26. The shims 28 are short segments of angle iron with a bore through one side thereof for receiving a threaded fastener 29 for attaching the shims 28 to the first frame member 15. FIGS. 4, 5 and 6 illustrate how the angle between the first and second frame members 15, 16 can be changed by changing the number of shims 28 attached to the first frame member 15.

A second abutment 30 and second adjustment means 31 are provided for setting an angle at which the second frame member 16 extends relative to the first frame member 15 in a folded up position. The second abutment 30 is an integral surface on a top side of the second frame member 16. The second adjustment means 31 is a threaded member with a head 32 that engages the second abutment 30.

A pair of spring members 33 are attached between the first and second frame members 15, 16 at locations 34, 35 spaced from the first pivot connection 25. The spring members 33 are arranged to hold the second frame member 16 in a first over-center condition relative to the first pivot connection 25 when the second frame member 16 is in its folded down position (FIGS. 1, 2 and 4 to 6), and in a second over-center condition relative to the first pivot connection 25 when the second frame member 16 is in its folded up position (FIG. 3).

The third frame member 17 is connected to the second end 23 of the second frame member 16 by a structure that allows the angle between the second and third frame members 16, 17 to be adjusted. The third frame member 17 is attached to the second frame member 16 by a first pin 36 that extends through a first set of aligned bores in the second and third frame members 16, 17, and a second pin 37 that extends through a second set of aligned bores in the second and third frame members 16, 17. The second set of aligned bores comprises a plurality of bores 37a in the third frame member 17 that can be selectively aligned with a bore in the second frame member 16 to provide a plurality of discrete adjusted positions of the third frame member 17 relative to the second frame member 16. The third frame member 17 is pivotally adjusted relative to the second frame member 16 about the axis of the first pin 36. By adjusting the angle between the second and third frame members 16, 17, the platform 18 mounted on the third frame member 17 can be adjusted to a horizontal position when an angle of the second frame member 16 relative to horizontal is changed.

The platform 18 is attached to the third frame member 17 and can be adjusted to a desired height by adjusting the second frame member 16 relative to the first frame member 15, and to a generally horizontal position by adjusting the third frame member 17 relative to the second frame member 16. These adjustments allow the platform 18 to be properly positioned to accommodate various heights of receiver hitches and truck beds. The platform 18 can have a paw-shaped surface, as illustrated, or it can have a more conventional shape, such as a round or rectangular shape. The paw-shaped surface of the platform 18 is particularly suited for use as a dog step.

While the invention has been specifically described in connection with specific embodiments thereof, it is to be understood that this is by way of illustration and not of limitation, and the scope of the appended claims should be construed as broadly as the prior art will permit.

What is claimed is:

1. A dog step attachment for use with a pickup truck, comprising:
    a first frame member adapted to be received in a receiver hitch of the pickup truck and extend rearwardly from said receiver hitch;
    a second frame member having first and second ends, said first end being pivotally connected to a rearward end of said first frame member by a first pivot connection;
    a third frame member connected to the second end of said second frame member; and
    a platform attached to and supported by said third frame member for providing an intermediate step for assisting a dog in jumping into a bed of the pickup truck;
    further comprising a first abutment and first adjustment means for limiting an extent of movement of the second frame member in a first direction about said first pivot connection for adjustably setting an angle at which said second frame member extends relative to said first frame member in a folded down position to accommodate different heights of receiver hitches;
    further comprising a second abutment and second adjustment means for limiting an extent of movement of the second frame member in a second direction about said first pivot connection for adjustably setting an angle at which said second frame member extends relative to said first frame member in a folded up position; and
    wherein said third frame member is connected to said second frame member by a means for adjusting an angle at which said third frame member extends relative to said second frame member to allow said platform to be adjusted to a horizontal position when an angle of said second frame member relative to horizontal is changed.

2. The dog step attachment according to claim 1, wherein said first abutment is located on a bottom side of the first end of the second frame member.

3. The dog step attachment according to claim 1, wherein said first adjustment means comprises a plurality of shims that can be selectively attached to said first frame member to provide a surface for engaging said first abutment.

4. The dog step attachment according to claim 3, wherein said shims comprise short segments of angle iron with a bore through one side thereof for receiving a threaded fastener for attaching said segments to said first frame member.

5. The dog step attachment according to claim 1, wherein said second abutment is located on a top side of said second frame member.

6. The dog step attachment according to claim 1, wherein said second adjustment means comprises a threaded member having a head that engages said second abutment.

7. The dog step attachment according to claim 1, further comprising at least one spring member attached between said first frame member and said second frame member and arranged to hold said second frame member in a first over-center condition when said second frame member is in said folded down position and a second over-center condition when said second frame member is in said folded up position.

8. The dog step attachment according to claim 1, wherein said third frame member is attached to said second frame member by a first pin that extends through a first set of aligned bores in said second and third frame members, and a second pin that extends through a second set of aligned bores in said second and third frame members.

9. The dog step attachment according to claim 8, wherein said second set of aligned bores comprises a plurality of bores in said third frame member that can be selectively aligned with a bore in said second frame member to provide a plurality of discrete adjusted positions of the third frame member relative to the second frame member about an axis of said first pin.

10. The dog step attachment according to claim 1, wherein said platform comprises a paw-shaped surface for providing a step for a dog.

11. In combination, a pickup truck having a bed, a tailgate, and a receiver hitch, and a dog step attachment attached to said receiver hitch, said dog step attachment comprising:
a first frame member received in said receiver hitch of the pickup truck and extending rearwardly from said receiver hitch;
a second frame member having first and second ends, said first end being pivotally connected to a rearward end of said first frame member by a first pivot connection;
a third frame member connected to the second end of said second frame member; and
a platform attached to and supported by said third frame member for providing an intermediate step for assisting a dog in jumping into the bed of the pickup truck;
said second frame member being movable relative to said first frame member between a folded down position for use as a dog step and a folded up position for transport;
further comprising a first abutment and first adjustment means for limiting an extent of movement of the second frame member in a first direction about said first pivot connection for adjustably setting an angle at which said second frame member extends relative to said first frame member in a folded down position to accommodate different heights of receiver hitches;
further comprising a second abutment and second adjustment means for limiting an extent of movement of the second frame member in a second direction about said first pivot connection for adjustably setting an angle at which said second frame member extends relative to said first frame member in a folded up position; and
wherein said third frame member is connected to said second frame member by a means for adjusting an angle at which said third frame member extends relative to said second frame member to allow said platform to be adjusted to a horizontal position when an angle of said second frame member relative to horizontal is changed.

12. The combination according to claim 11, wherein said platform is horizontal and located rearward of and below said tailgate when said tailgate is opened into a horizontal position and said second frame member is in its folded down position.

13. The combination according to claim 12, wherein said platform is substantially vertical and located rearward of said tailgate when said tailgate is closed into a vertical position and said second frame member is in its folded up position.

14. The combination according to claim 11, further comprising at least one spring member attached between said first frame member and said second frame member and arranged to hold said second frame member in a first over-center condition relative to said first pivot connection when said second frame member is in said folded down position and a second over-center condition relative to said first pivot connection when said second frame member is in said folded up position.

15. The dog step attachment according to claim 11, wherein said platform comprises a paw-shaped surface for providing a step for a dog.

* * * * *